(12) United States Patent
Bischel (10) Patent No.: US 9,861,914 B1
(45) Date of Patent: Jan. 9, 2018

(54) DEBRIS CATCHER

(71) Applicant: Jonathan R. Bischel, Bloomer, WI (US)

(72) Inventor: Jonathan R. Bischel, Bloomer, WI (US)

(*) Notice: Subject to any disclaimer, the term of this patent is extended or adjusted under 35 U.S.C. 154(b) by 0 days.

(21) Appl. No.: 15/609,261

(22) Filed: May 31, 2017

(51) Int. Cl.
*B01D 29/44* (2006.01)
*E03F 7/10* (2006.01)
*B01D 35/02* (2006.01)
*B01D 29/00* (2006.01)
*E03F 1/00* (2006.01)

(52) U.S. Cl.
CPC ......... *B01D 29/44* (2013.01); *B01D 29/0045* (2013.01); *B01D 35/02* (2013.01); *E03F 1/008* (2013.01); *E03F 7/106* (2013.01); *B01D 2201/265* (2013.01); *B01D 2201/4007* (2013.01); *B01D 2201/62* (2013.01)

(58) Field of Classification Search
CPC ... E03F 1/008; E03F 7/10; E03F 7/106; E03F 11/00; B01D 29/0045; B01D 29/356; B01D 29/44; B01D 35/02; B01D 2201/265; B01D 2201/4007; B01D 2201/62
USPC ....... 210/162, 170.08, 172.1, 241, 460, 461, 210/499, 532.2
See application file for complete search history.

(56) References Cited

U.S. PATENT DOCUMENTS

| | | | |
|---|---|---|---|
| 813,016 A * | 2/1906 | McHugh | E03F 1/003 210/460 |
| 1,254,125 A * | 1/1918 | Dash | B01D 35/02 210/499 |
| 3,369,760 A | 2/1968 | Schaible | |
| 3,606,097 A | 9/1971 | Wall | |
| 5,074,473 A | 12/1991 | Bauer | |
| 5,476,588 A * | 12/1995 | Nagaoka | B01D 29/445 210/499 |
| 5,779,888 A * | 7/1998 | Bennett | B01D 29/445 210/162 |
| 6,155,277 A | 12/2000 | Barry | |
| 6,354,340 B1 | 3/2002 | Craine et al. | |
| 6,497,816 B2 * | 12/2002 | Naddy | B01D 29/336 210/460 |
| 6,682,651 B1 * | 1/2004 | Toland | B01D 35/02 210/461 |
| 6,790,368 B1 * | 9/2004 | Vachon | E03F 7/10 210/170.08 |
| 8,919,572 B1 * | 12/2014 | Westaby | B01D 35/28 210/172.1 |

OTHER PUBLICATIONS

Imperial Industries Incorporated, Debris Collector, still frame from video, prior to May 31, 2017, start page, published at http://www.imperialind.com/commercial-waste-tanks-parts/parts/debris-collectors/.

(Continued)

*Primary Examiner* — Christopher Upton (74) *Attorney, Agent, or Firm* — Anthony J. Bourget (57) ABSTRACT

A method of discharge and a debris catching device for connection to a discharge pipe of a tank of a septic truck where the device includes a fitting to connect to the pipe and an exposed catcher connected to the fitting such that the catcher has fingers in a spaced relation from an output port of the fitting. The fingers span in spaced relation to each other and allow septage expelled from the fitting to pass through the catcher and onto a field where the truck is moving forward.

21 Claims, 6 Drawing Sheets

(56) References Cited

OTHER PUBLICATIONS

Imperial Industries Incorporated, Debris Collector, still frame from video, prior to May 31, 2017, 0:01/1:12 (seconds:minutes location in video), published at http://www.imperialind.com/commercial-waste-tanks-parts/parts/debris-collectors/.

Imperial Industries Incorporated, Debris Collector, still frame from video, prior to May 31, 2017, 0:48/1:12 (seconds:minutes location in video), published at http://www.imperialind.com/commercial-waste-tanks-parts/parts/debris-collectors/.

* cited by examiner

DEBRIS CATCHER

BACKGROUND OF THE INVENTION

1. Field of the Invention

This invention relates to the field of material catchers, and particularly to devices which connect to a discharge valve of a septic pump truck.

2. Background Information

The discharge onto an open field of material pumped from septic tanks or holding tanks is common. Typically a septic truck having a tank and pumping capability will travel to the location of the home or building in need of septic pumping. A hose is drawn from the tank of the truck and into the septic tank or holding tank and the sewage or septage and waste is pumped from the holding tank and into the tank of the truck. Thereafter the truck travels to a disposal facility or to an open field where the material is released. Release of the material onto an open field is desirable as noted below.

Applicant is aware of one device presently designed to collect debris expelled from a discharge pipe of a septic tank truck. Imperial Industries Inc. of Wausau, Wis., markets a DEBRIS COLLECTOR which attaches to the discharge pipe and framework of a septic pump truck. The pump truck is or can be a standard type of pumping truck having a tank which receives waste pumped from a septic tank or septic holding tank or other location. An example of the device is presented in a video located at http://www.imperialind.com/commercial-waste-tanks-parts/parts/debris-collectors/. The debris collector includes a small vessel mounted to a frame at the rear of the tank truck. The collector vessel attaches to the discharge outlet of the tank of the truck. A grid is positioned inside the closed vessel to trap or capture debris which is discharged from the discharge pipe of the truck. The uncaptured waste proceeds to be discharged from a valve opposite the discharge pipe of the truck. A user may open and close an end of the vessel to insert or remove the grid/filter to capture and remove the debris.

While the foregoing is one attempt to capture debris from a discharge pipe of a tank truck, there is room for improvement.

SUMMARY OF THE INVENTION

In one aspect the invention pertains to a device configured to connect to a septic pump truck tank discharge pipe and to catch debris released from the tank. Typically the debris includes human sewage or septage and waste which is pumped from a septic tank or holding tank. In one aspect the device includes a fitting having a nozzle at a first end and an output port at a second end, the nozzle configured to connect to the discharge pipe of a tank of a septic truck and the output port at configured to allow discharge of material form the tank through the fitting, and a catcher extending from the fitting such that material discharge from the output port along a straight direction of flow crosses an exposed gap between the output port and a the catcher.

In a further aspect the invention includes a debris catching device having a fitting with a nozzle at a first end and an output port at a second end, the nozzle configured to connect to a discharge pipe and the output port configured to allow discharge of material from the a tank through the fitting, and at least one arm connected to and extending from the fitting, the arm having a catch finger extending upward from the arm and in a spaced relationship from the output port.

In a further aspect the present invention comprises a debris catching device having a fitting with a nozzle at a first end and an output port at a second end, the nozzle configured to connect to a discharge pipe of a septic tank truck, and a catcher extending from the fitting such that material discharged from the output port along a straight or relatively straight direction of flow crosses a gap between the output port and at least a portion of the catcher.

In a further aspect the invention includes a method of discharging septage on a field comprising the step of passing septage through a fitting and against an exposed catcher where the catcher is oriented generally vertically in relation to the direction of septage flow. A further aspect includes viewing the release via a rearview camera while driving forward with the pump truck.

The above partial summary of the present invention is not intended to describe each illustrated embodiment, aspect, or every implementation of the present invention. The figures and detailed description and claims that follow more particularly exemplify these and other embodiments and further aspects of the invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Figure 1:
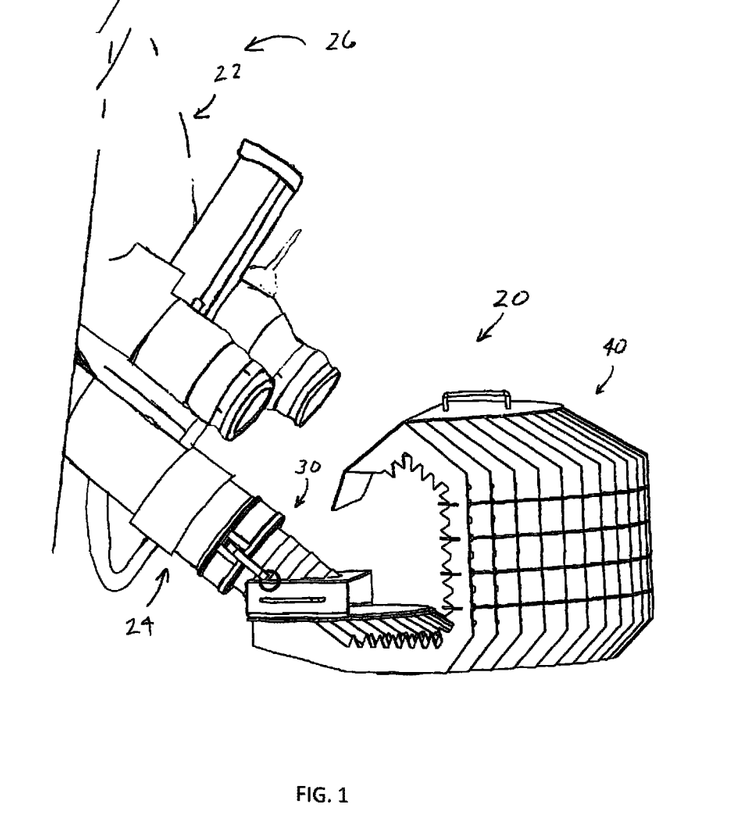
FIG. 1 is a perspective view of a device made in accordance with one aspect of the present invention and showing connection to a discharge pipe in one operational aspect of the invention.

Referring to FIGS. 1-13, aspects of a device for connecting to a discharge pipe of a tank to catch debris discharged from the pipe are shown. FIG. 1 depicts device 20 connected to a tank 22 of truck 26. Device 20 includes a fitting 30 configured to connect to a discharge pipe 24 of the tank 22, such as the tank of a tank truck 26. A typical tank truck 26 includes a truck having an engine and wheels which drives about roadways and fields and is used to pump and transport sewage or septage from septic systems and holding tanks. The truck holds the septage in a tank 22 associated with the truck and in one operational aspect discharges the septage onto an open field. The truck moves forward while septage is pressure discharged from the tank so that the septage may be dispersed for fertilizing purposes. Discharge of the septage on a farm field avoids the high cost of transporting the truck to a wastewater processing facility and also avoids the high cost of paying to have the discharged material treated at the treatment or processing facility. An operator of a septic business and a farmer have incentive to discharge on an open field where the material also benefits crops as fertilizer. A drawback of open-field discharge is the requirement to refrain from discharge of large materials and litter. For instance, humans dispose of all sorts of materials into the septic or holding tanks. Many of these materials are large and sometimes do not decompose into smaller units. Examples of some commonly disposed larger materials found in septage include feminine hygiene products, prophylactics, food products, bones, plastics, toys, cellphones, jewelry, hair, and other general garbage or waste materials. If large materials or litter is discharged onto the field, an operator is obligated to pick-up or remove those materials. If the large materials or litter are not removed, the environment can be damaged. Failure to remove the large materials and litter may also result in a fine imposed on the septic tank operator or farmer for improper discharge of septage. In some states a Department of Natural Resources or other governing body will impose rules or regulations where all landspreading fields shall be left in a litter free condition. In some instances materials larger than 2 inches, for example, must be picked-up or removed from the open field. The present device is designed to capture litter and such larger materials so that the removal may be accomplished conveniently and without having to walk the open field through the newly spread septage in order to pick-up the larger pieces of material.

Figure 2:
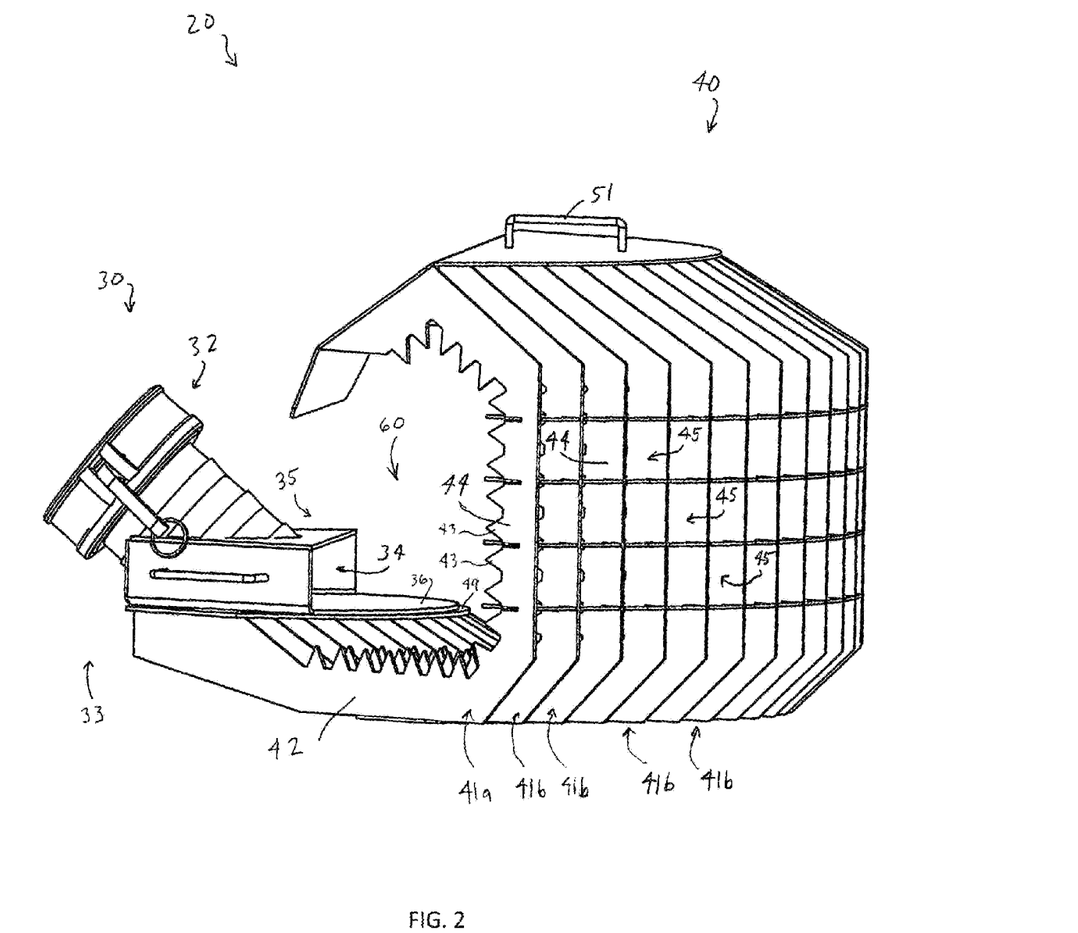
FIG. 2 is a perspective view of the device shown in FIG. 1.
Figure 3:
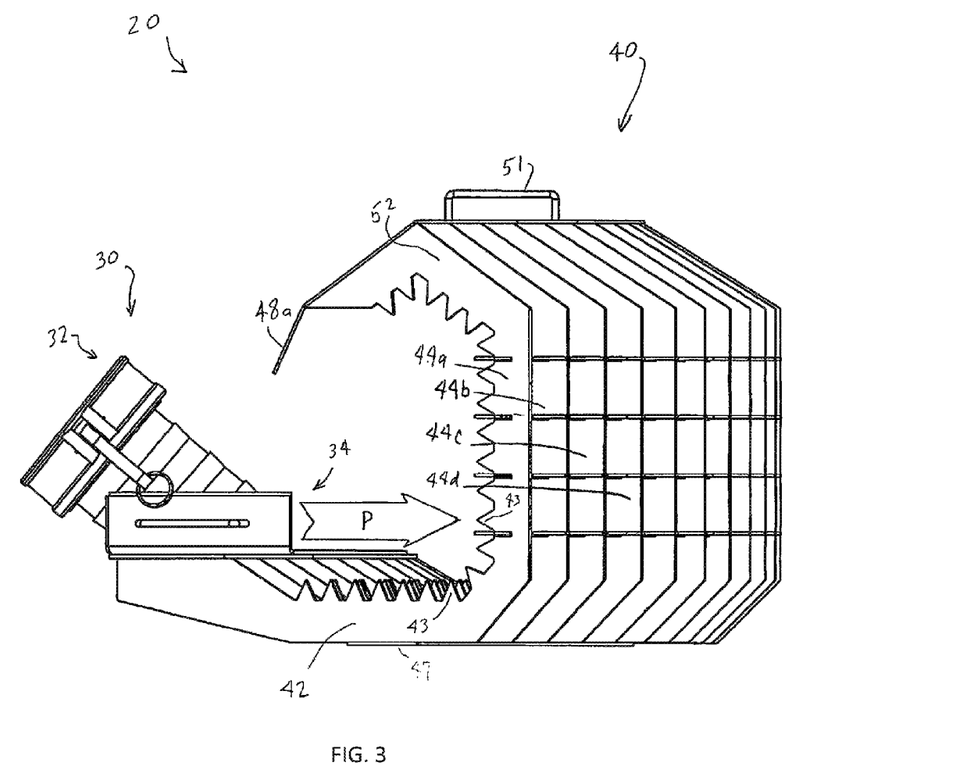
FIG. 3 is a side view of the device of FIG. 2.

The present device 20 catches litter and large debris items from the discharged material. With reference to FIG. 1 and FIG. 2, device 20 includes a fitting 30 which has a nozzle 32 positioned at a first end 33 of fitting 30 and is configured to connect to the discharge pipe 24 of tank 22. An output port 34 at a second end 35 of the fitting 30 allows for discharge of material from the tank 22 through the fitting 30. Connected to the fitting 30 is a catcher 40 which is configured to catch litter and large items of debris while allowing smaller items of debris and liquids to pass. Catcher 40 extends rearward from the fitting 30 such that material discharged from the output port 34 along a straight direction of flow, such along discharge flow path "P" as shown in FIG. 3, travels to meet catcher 40. Discharged material will either pass through catcher 40 or contact the elements of catcher 40 described herein. Catcher 40 has a plurality of catch fingers 44 which extend upward and extend at least in part into the discharge flow path P. In one aspect, catcher 40 includes an arm 42 which extends rearward of fitting 30. Extending upward from arm 42 is a catch finger 44. Catch finger 44 includes a plurality of prongs 43 which are configured to catch larger pieces of debris. The catch fingers 44 and prongs 43 also tend to cut or tear debris which is expelled under pressure from discharge pipe 24. The high pressure of the discharge causes some debris to contact catch fingers 44 and prongs 43 at high impact, resulting in tearing or splitting of the debris into smaller pieces acceptable for discharge onto a field. The larger items of debris are caught upon the catch fingers 44 and prongs 43. Debris items also drop upon arm 42 and prongs 43 or upon one of a plurality of arms 42. In one aspect a plurality of arms 42 extend from fitting 30 where each of the arms 42 includes a catch finger 44 extending upward and within the discharge flow path P. Each of the arms 42 and catch fingers 44 may include a prong or prongs 43.

Figure 4:
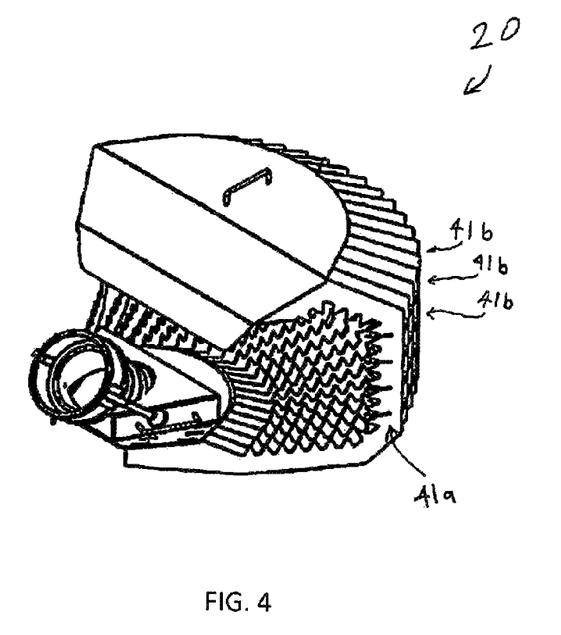
FIG. 4 is a perspective view of the device of FIG. 2.
Figure 5:
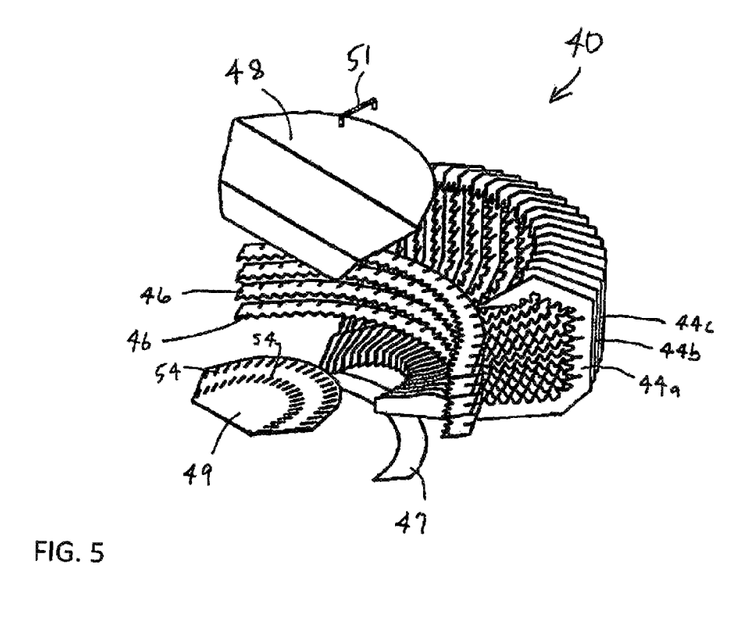
FIG. 5 is an exploded perspective view of a catcher component of the device of FIG. 2.

As shown in FIG. 4 and FIG. 5, device 20 and catcher 40 include an array of spaced or fanned catch fingers 44. In one aspect the catch fingers 44 are connected to a mounting plate 49. Plate 49 has pre-set slots into which catch fingers 44 are received. In one aspect, catcher 40 is made of aluminum material where aluminum catch fingers 44 are welded upon mounting plate 49. Stiffener bars or cross members 46 are positioned between catch fingers 44 and also set into position. The cross member 46 and catch fingers 44 may also be welded into position. In one aspect the cross members 46 and catch finger 44 include corresponding grooves 57 (see FIG. 6 for instance, for grooves 57 associated with catch finger 44a) so that cross members 46 are set or nested within the catch fingers 44 for locking engagement. A resulting honeycomb structure is created, which provides structural strength in a lightweight device while allowing material and liquid to pass. A plurality of openings 45 are formed by the resulting plurality of catch fingers 44 and cross members 46. Material and liquids discharged from fitting 30 may pass freely through openings 45. While the device 20 in one aspect is made of aluminum materials, use of other materials is possible. FIG. 5 is an exploded perspective view of catcher 40 and also shows bottom stiffener bar 47 and deflector 48. Deflector 48 includes a forward segment 48a which extends anterior output port 34 (See FIG. 3) when deflector 48 is positioned upon catch finger top portion 52. Catch finger top portion 52 extends forward from catch finger 44. Positioning deflector 48a anterior output port 34 reduces or eliminates splash back of debris or materials upon tank 22 or upon tank truck 26. A handle 51 is positioned on deflector 48. Other handles 51 are provided as shown for ease of attachment and transport of device 20. In one aspect device 20 is made of aluminum and weighs approximately 50 pounds. A user is able to lift the device 20 with a single hand similar to lifting a suitcase. A person connects or disconnects device 20 from discharge pipe 24 without assistance (or with assistance if desired). The multiple handles 51 allow for easy carrying and attachment of device 20. The quick connect locking mechanisms 31 allow a single person to conveniently position device 20 and attach or detach device 20 from the pipe 24.

Figure 6:
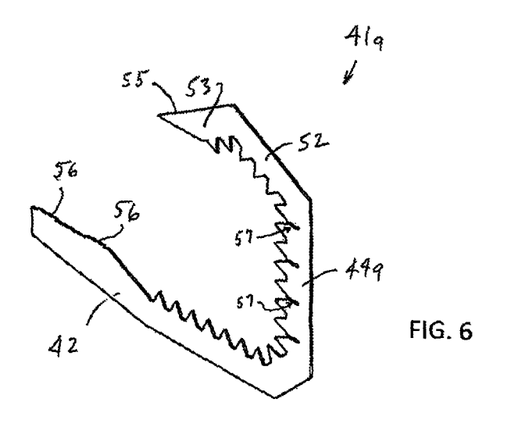
FIG. 6 is a perspective view of a component of the device shown in FIG. 5.
Figure 7:
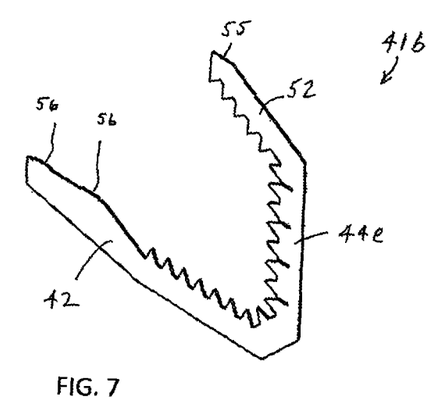
FIG. 7 is a perspective view of a component of the device shown in FIG. 5.

FIG. 6 is a perspective view of catcher element 41a and FIG. 7 is a perspective view of catcher element 41b. In one aspect a pair of elements 41a are positioned at opposite sides of catcher 40 and a plurality of elements 41b positioned between elements 41a. Element 41a includes an arm 42 which extends from fitting 30 and includes an upwardly extending catch finger 44a. A tip 53 extends from catch finger top portion 52 which extends forward from catch finger 44a. Tip 53 includes a top surface 55 upon which deflector 48 rests. Forward segment 48a of deflector extends generally downward from tip 53. Catcher element 41a includes tabs 56 configured to insert into respective slots 54 of mounting plate 49 (See FIG. 5). Cather elements 41b also include tabs 56 to insert within slots 54 of plate 49. Catcher element 41b also includes arm 42 with catch finger 44 extending upward and catch finger top portion 52 extending forward. Catch finger 44 receives deflector 48 at top surface 55.

Figures 8, 9, 10, 11:
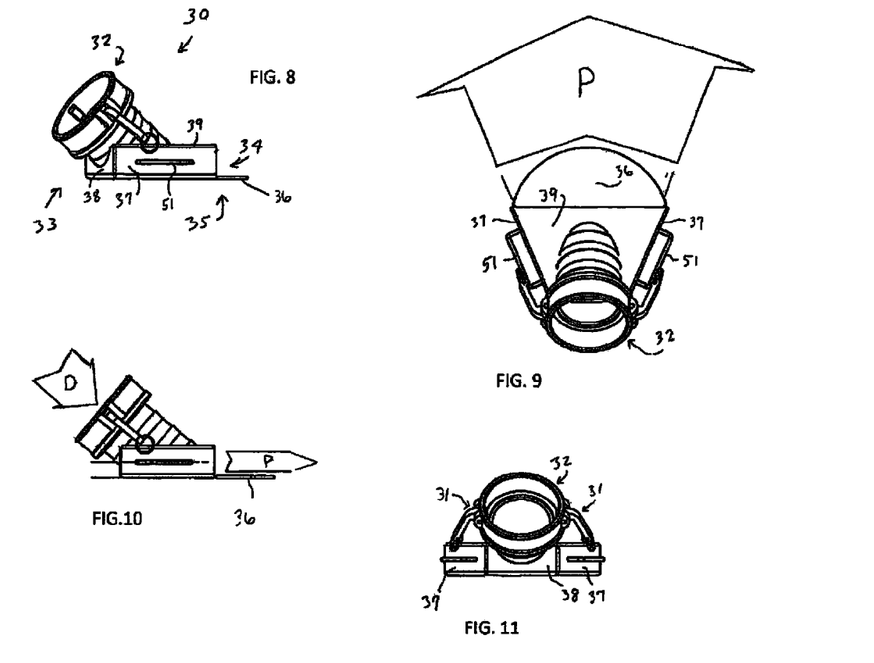
FIG. 8 is a perspective view of a component of the device of FIG. 2.
FIG. 9 is a top view of the device of FIG. 8.
FIG. 10 is a side view of the device of FIG. 8.
FIG. 11 is a side view of the device of FIG. 8.
Figure 12:
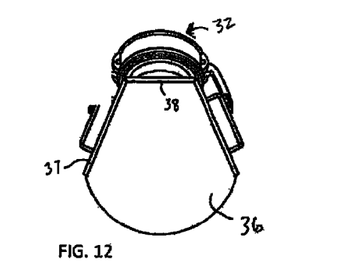
FIG. 12 is a bottom view of a device of FIG. 8.
Figure 13:
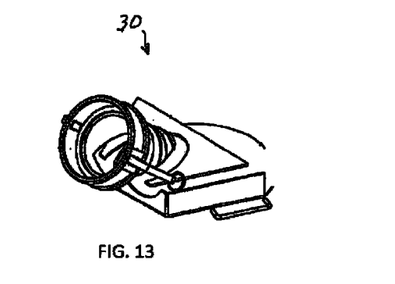
FIG. 13 is an exploded perspective view of the device of FIG. 8.

FIG. 8 is a perspective view of fitting 30. Fitting 30 in one aspect includes a spreader pan 36 having a generally "V" shaped configuration which expands away from the first end 33. Spreader pan 36 includes side walls 37 which may be integrally connected to the bottom of pan 36 and bent into position. The side walls also spread outward away from first end 33. FIG. 9 is a top view of fitting 30 and depicts the discharge flow path P, which represents the path of travel of material discharged from output port 34. Flow path P extends toward and to catch fingers 44. FIG. 10 is a side view of fitting 30 and generally shows a direction of discharge flow "D" from tank 22 into nozzle 32 of the fitting 30 and exit of the same material along discharge flow path P. FIG. 11 is an end view of fitting 30 and includes a collar wall 38 configured to receive a portion of nozzle 32. FIG. 11 also shows spreader side walls 37. Nozzle 32 includes cam locking mechanisms 31 configured to secure device 20 to discharge pipe 24. Locking mechanisms 31 operate by adjustment of a lever to secure or lock nozzle 32 to pipe 24. Other connecting and/or locking mechanisms may also be used to secure nozzle 32 and device 20 to discharge pipe 24 and tank 22. FIG. 12 is a bottom view of fitting 30 and shows a bottom side of spreader pan 36 with the generally "v" shaped configuration. FIG. 13 is an exploded perspective view of fitting 30 depicting one aspect of construction and assembly. Different construction and assembly methods may also be used.

In one aspect, 20 separate catcher elements 41b are positioned between two separate catcher elements 41a, and four cross members 46 are interspersed within the catcher elements to form a general lattice or honeycomb structure. The members in one aspect are welded into position. All surfaces are exposed to allow for easy cleaning with a simply spray hose.

In further reference to FIG. 2, material expelled from output port 34 under pressure travels generally along a straight line (or the construction of fitting 30 configured such that discharge flow path P has a slightly upward discharge angle) and crosses an exposed gap 60 between the output port 34 and catcher elements 41. The material discharged from output port 34 is exposed to atmosphere and the path of travel is not inhibited (or substantially not inhibited) until the material contacts catcher 40 (or where material passes freely through catcher 40).

In further reference to FIG. 4 and FIG. 5, device 20 includes catcher 40 which is a weldment having a plurality of spaced catch fingers 44 and a plurality of spaced cross members 46. When device 20 is connected to a discharge pipe 24, the catch fingers are generally vertically oriented and the cross members are generally horizontally oriented. The plurality of catch fingers and cross members form a plurality of tunnel openings 45. The tunnel openings 45 have a tunnel-like configuration and direct septage from the tank 22. The tunnel-like or lattice-like structure provides a lightweight and rugged support structure for device 20. In one aspect the pieces of weldment 40 are assembled together and secured with welds at the various joints. A fitting 30 is secured to weldment 40. The fitting 30 is configured to connect to the discharge pipe 24 of a tank truck 26 and accommodates release of septage material from the tank 22. The material passes through output port 34 to atmosphere and across gap 60 to weldment 40. At weldment 40 the material passes through the plurality of tunnel openings, or a portion of the septage contacts or is caught against catch fingers 44. The plurality of tunnel openings 45 are positioned in a spaced relationship from the fitting 30. Such separation allows the discharged septage to flow unrestricted (and without increasing pressure) for at least a short distance before contact is made with weldment 40. Such separation which leads to a relative pressure decrease allows for less stress applied to weldment 40 while also allowing a desired dispersion of septage and catching of debris. Because the catch fingers 44 span at different angles, the resulting tunnel openings have an increasing or larger volume at the posterior of the weldment as compared to at the anterior of the weldment.

In operation device 20 is attached to discharge pipe 24. When truck 26 is positioned on an open field, septage material is discharged from tank 22 through pipe 24 and out through output port 34. While the truck is moving forward the material from within tank 22 is expelled under pressure and with high velocity is projected along discharge flow path P and through openings within catcher 40. Device 20 is configured such that material is discharged longitudinally and generally horizontally from output port 34. Materials and litter from the discharge that are too large to pass through openings 45 are caught against catch fingers 44. As more materials are caught, the opening will effectively narrow, thus causing a greater force against catcher 40 and higher impact forces to break or tear larger materials and further catch litter. After the tank has completed the discharge, an operator may clear the caught materials of the debris for proper disposal (not upon the open field). Device 20 is then disconnected from discharge pipe 24 and placed on the field to act as a marker for the location for a subsequent field discharge. Device 20 is cleaned with a simple spray hose and left to dry in the field. Device 20 is easily cleared of all debris with simple open air spraying. The lightweight aluminum construction allows a single person to disconnect device 20 from discharge pipe 24. The nozzle 32 is a single point of contact/connection of device 20 to the discharge pipe 24. Because of the light-weight nature of device 20, no additional supporting structures are required. A different device 20 may be located at each discharge field for convenient operation and without need to transport device 20.

A method aspect of the invention includes passing septage through a fitting which is connected to a discharge pipe 24 of a tank of a moving septic tank truck 26 and through an exposed catcher 40 extending from the fitting and oriented generally perpendicular to a direction of discharge flow from the fitting.

In a further method aspect a camera is situated on truck 26 such that a rear view of the device 20 is observed by the driver when driving the truck 26 forward. The rear-viewing camera (for instance, a video camera) allows the operator to drive forward while viewing the rear discharge of material through device 20. The operator ascertains the rate of flow by visual inspection to determine if or to what extent the device 20 is clogged or has a build-up of debris. For instance, where a relatively large volume of debris is captured upon device 20, the rate of flow rearward of device 20 will be less than the rate of flow where there is no or minimal debris caught within device 20. Likewise, the amount of spatter of released material will be greater when catcher 40 is filled or includes a greater amount of captured debris. An operator ascertains the relative change in the amount of spatter and/or the rearward flow of material from catcher 40 to determine when or whether to stop or adjust further discharge from the tank and/or the forward motion or rate of motion of the truck. The operator may adjust or pause the discharge or motion of the truck and exit the driver's compartment to clear the build-up of debris from device 20. By utilizing the rear-view camera, the operator will be able to better determine whether or when to pause or adjust, thus allowing the operator greater certainty and control over the operation with the ability to save time in the discharge operation (i.e., save time by eliminating the need to exit the driver compartment and/or by reducing pausing of discharge due to uncertainty of clogging). Absent a rear-view camera the operator would make a decision to adjust or pause unnecessarily or fail to adjust or pause and experience a messy spatter or inefficient discharge. The rear-view camera also allows the operator to safely drive forward while conveniently monitoring the rear discharge (instead of relying solely on use of mirrors, experience or guesswork). In this way a less experienced operator will nonetheless be able to efficiently attend to an appropriate discharge operation. Because device 20 also reduces or eliminates the amount of litter that is applied to a field (materials that pass are generally acceptable for field application), the operator spends minimal or no time or effort walking back over the field to pick up debris that would otherwise be caught in catcher 40. Here again, a difficult or undesirable job is made easier by use of the present device 20 and methods of invention.

It should be understood, of course, that the foregoing relates to exemplary embodiments of the invention and that modifications may be made without departing from the spirit and scope of the invention as set forth in the following claims.

What is claimed is:

1. A debris catching device for connecting to a discharge pipe of a tank, the device comprising:
    a fitting having a nozzle at a first end and an output port at a second end, the nozzle configured to connect to the discharge pipe and the output port configured to allow discharge of material from the tank through the fitting; and
    at least one arm connected to and extending from the fitting, the arm having a catch finger extending upward from the arm and in a spaced relationship from the output port.

2. The device of claim 1 where material discharged from the output port along a generally horizontal discharge path contacts at least a portion of the at least one catch finger.

3. The device of claim 1 where the output port in part defines a discharge flow path extending longitudinally from the output port, at least a portion of the at least one catch finger positioned within the discharge flow path.

4. The device of claim 3 where the fitting is configured such that when connected to the discharge pipe the discharge flow path extends generally horizontally.

5. The device of claim 1 wherein the device is configured such that the fitting is a sole connection point of the device to the discharge pipe of a tank of a tank truck.

6. The device of claim 1 wherein a plurality of catch fingers are positioned in spaced relationship with the output port and at least a portion of each of the plurality of catch fingers is positioned within a discharge flow path defined in part by and extending longitudinally from the output port.

7. The device of claim 1 wherein a plurality of catch fingers are positioned in spaced relationship with the output port and in part form a lattice structure defining a plurality of openings through which material discharged from the tank and through the device may pass.

8. The device of claim 1 further comprising a plurality of arms connected to and extending from the fitting, each of the arms having a catch finger extending upward and in a spaced relationship from the output port, the catch fingers defining a plurality of openings through which material discharged from the fitting may pass.

9. The device of claim 8 further comprising a plurality of cross members connected to the catch fingers and together forming a honeycomb structure having a plurality of openings through which material discharges.

10. The device of claim 1 further comprising a deflector connected to the catch finger.

11. The device of claim 10 where the catch finger includes a top portion extending forward, the deflector connected to the top portion and extending anterior the output port.

12. The device of claim 1 where the nozzle includes a cam locking mechanism configured to secure the device to a discharge pipe.

13. A debris catching device for connecting to a discharge pipe of a tank, the device comprising:
    a fitting having a nozzle at a first end and an output port at a second end, the nozzle configured to connect to the discharge pipe and the output port configured to allow discharge of material from the tank through the fitting; and
    a catcher extending externally from the fitting such that material discharged from the output port along a straight direction of flow crosses an exposed gap between the output port and at least a portion of the catcher, the at least a portion of the catcher including passageways located above the output port.

14. The device of claim 13 where the catcher includes a plurality of spaced catch fingers and a plurality of spaced cross members to form a plurality of openings, the catch fingers positioned in a generally vertical orientation when the device is connected to the discharge pipe.

15. The device of claim 13 where vertically oriented fingers form the passageways.

16. A debris catching device for connecting to a discharge pipe of a tank, the device comprising:
    an exposed weldment having a plurality of spaced and generally vertically oriented catch fingers and a plurality of spaced and generally horizontally oriented cross members, the catch fingers and cross members defining a plurality of tunnel openings; and
    a fitting configured to connect to the discharge pipe and accommodate release of material from the tank and through the plurality of tunnel openings, the plurality of tunnel openings positioned in a spaced relationship from the fitting, at least a portion of the tunnel openings positioned above the fitting.

17. The device of claim 16 where the fitting includes a nozzle configured to connect to the discharge pipe and includes an output port opposite the nozzle, the nozzle configured to receive septage along a discharge flow path from the tank along a first direction and the output port configured to discharge septage along a discharge flow path from the fitting along a second direction, the second direction being different than the first direction.

18. The device of claim 16 where the plurality of catch fingers are connected to the plurality of cross members by welds.

19. The device of claim 16 wherein the fitting includes a nozzle configured to connect to the discharge pipe and wherein the weldment includes a deflector connected to the catch fingers, the deflector extending below an uppermost portion of the nozzle.

20. The device of claim 16 where the plurality of catch fingers include grooves into which the plurality of cross members are inserted.

21. A debris catching device for connecting to a discharge pipe of a tank, the device comprising:
- an exposed weldment having a plurality of spaced and generally vertically oriented catch fingers and a plurality of spaced and generally horizontally oriented cross members, the catch fingers and cross members defining a plurality of tunnel openings; and
- a fitting configured to connect to the discharge pipe and accommodate release of material from the tank and through the plurality of tunnel openings, the plurality of tunnel openings positioned in a spaced relationship from the fitting, where the catch fingers extend from respective arms and the fitting is positioned upon the respective arms.

* * * * *